US008380559B2

(12) United States Patent
Crotty et al.

(10) Patent No.: US 8,380,559 B2
(45) Date of Patent: Feb. 19, 2013

(54) IDENTIFYING LUXURY MERCHANTS AND CONSUMERS

(75) Inventors: Karlyn Heiner Crotty, Pennington, NJ (US); Prashant Kalia, Fair Lawn, NJ (US); Suby P. Philip, East Meadow, NY (US); Danny M. Yelle, Stamford, CT (US)

(73) Assignee: American Express Travel Related Services Company, Inc., New York, NY (US)

( * ) Notice: Subject to any disclaimer, the term of this patent is extended or adjusted under 35 U.S.C. 154(b) by 901 days.

(21) Appl. No.: 12/144,503

(22) Filed: Jun. 23, 2008

(65) Prior Publication Data
US 2009/0171765 A1 Jul. 2, 2009

Related U.S. Application Data

(60) Provisional application No. 61/018,153, filed on Dec. 31, 2007.

(51) Int. Cl.
*G06Q 30/00* (2006.01)

(52) U.S. Cl. ........................ 705/7.35; 705/7.33

(58) Field of Classification Search ............... 705/7.33, 705/7.35
See application file for complete search history.

(56) References Cited

U.S. PATENT DOCUMENTS

| 6,018,718 | A * | 1/2000 | Walker et al. | 705/14.17 |
| 6,073,112 | A * | 6/2000 | Geerlings | 705/10 |
| 6,298,348 | B1 * | 10/2001 | Eldering | 705/10 |
| 6,430,539 | B1 * | 8/2002 | Lazarus et al. | 705/7.31 |
| 6,904,409 | B1 * | 6/2005 | Lambert et al. | 705/7.33 |
| 7,146,002 | B1 * | 12/2006 | Smith et al. | 379/265.13 |
| 7,584,126 | B1 * | 9/2009 | White | 705/35 |
| 2001/0037268 | A1 * | 11/2001 | Miller | 705/31 |
| 2002/0049626 | A1 * | 4/2002 | Mathias et al. | 705/10 |
| 2002/0052782 | A1 * | 5/2002 | Landesmann | 705/14 |
| 2003/0009368 | A1 * | 1/2003 | Kitts | 705/10 |
| 2003/0088562 | A1 * | 5/2003 | Dillon et al. | 707/5 |
| 2005/0159996 | A1 * | 7/2005 | Lazarus et al. | 705/10 |
| 2006/0242039 | A1 * | 10/2006 | Haggerty et al. | 705/35 |
| 2006/0242050 | A1 * | 10/2006 | Haggerty et al. | 705/35 |
| 2006/0253329 | A1 * | 11/2006 | Haines et al. | 705/14 |
| 2006/0259364 | A1 * | 11/2006 | Strock et al. | 705/14 |
| 2007/0244741 | A1 * | 10/2007 | Blume et al. | 705/10 |
| 2008/0082418 | A1 * | 4/2008 | Fordyce et al. | 705/14 |
| 2008/0133322 | A1 * | 6/2008 | Kalia et al. | 705/10 |
| 2008/0162258 | A1 * | 7/2008 | Kala et al. | 705/10 |
| 2008/0221972 | A1 * | 9/2008 | Megdal et al. | 705/10 |
| 2008/0255897 | A1 * | 10/2008 | Megdal et al. | 705/7 |
| 2009/0171687 | A1 * | 7/2009 | Crotty et al. | 705/1 |
| 2009/0216682 | A1 * | 8/2009 | Foladare et al. | 705/10 |

OTHER PUBLICATIONS

Caputo, "Targeting the luxury consumer," Jun. 2004, Wines & Vines.*
Johnson, "American Consumers' Purchasing Habits Broken Down and Analyzed," Published Feb. 7, 2005, Advertising Age.*
Sloan, ("Critical Evaluations in Business and Management," 2003, Routledge)—pp. 196-197.*
Rosset, "Wallet estimation models," 2005, In Proceedings of the International Workshop on Customer Relationship Management: Data Mining Meets Marketing (CRM Workshop).*
Phau, "Consuming luxury brands: The relevance of the 'Rarity Principle'," Nov. 2000, Brand Management, vol. 8, No. 2, pp. 122-138.*
Choo, "What Type of Vehicle Do People Drive? The Role of Attitude and Lifestyle in Influencing Vehicle Type Choice," 2004, Transportation Research Part A, vol. 38, pp. 201-22.*

* cited by examiner

*Primary Examiner* — Andre Boyce
*Assistant Examiner* — Ivan R Goldberg
(74) *Attorney, Agent, or Firm* — Snell & Wilmer L.L.P.

(57) ABSTRACT

Transaction-level data and size of wallet data may be used to identify luxury merchants. In an embodiment, luxury merchants are identified based on their average record of charge (ROC) size in combination with the percentage of high-wallet consumers who transact with the merchants. Customers having a high share of wallet spent at luxury merchants may be identified as luxury consumers.

18 Claims, 7 Drawing Sheets

IDENTIFYING LUXURY MERCHANTS AND CONSUMERS

CROSS REFERENCE TO RELATED APPLICATIONS

This application claims priority under 35 U.S.C. §119(e) to U.S. Provisional Patent Application No. 61/018,153 filed Dec. 31, 2007, which is incorporated by reference herein in its entirety.

BACKGROUND

1. Field of the Invention

The present invention relates to consumer modeling, specifically consumer modeling for marketing purposes.

2. Background Art

Certain individuals tend to spend a disproportionate amount of their available funds with luxury merchants. Transactions between luxury merchants and high-wallet individuals typically are for large amounts of money. As these individuals are more likely to spend their available funds at a luxury merchant as compared to the average individual, individuals are more likely to respond to opportunities and incentives that encourage their spending. However, it has been difficult for advertisers to accurately identify individuals who spend disproportionate amounts of their wallets with luxury merchants and offer relevant products to them.

SUMMARY

Embodiments of the invention may be used to identify consumers who spend disproportionately with a luxury merchant, that is, a luxury consumer. For example, a consumer may be identified where that consumer spends a portion of their wallet at one or more luxury merchants. The identified consumer is then ranked according to the percentage of the consumer's wallet that was spent at the one or more luxury merchants. When the portion of the consumer's wallet that was spent at the one or more luxury merchants exceeds a threshold, that consumer may be determined to be a luxury consumer. A merchant may be determined to be a luxury merchant based on the merchant's record of charge history and the merchant's percentage of high wallet customers.

In an embodiment, a system for identifying luxury merchants and consumers includes a luxury merchant identification module, a consumer identification module, a high-wallet customer identification module, a ranking module, and a luxury merchant and consumer determination module. The luxury merchant identification module may identify a merchant, which sells to a consumer. The consumer identification module may identify the consumer, which spends a portion of their wallet with the merchant. The high-wallet customer identification module may identify a consumer as being a high-wallet customer. The ranking module may rank the merchant based on the merchant's record of charge (ROC) data and the merchant's percentage of high-wallet customers. The luxury merchant and consumer determination module may determine whether the merchant is a luxury merchant based on the merchant's ROC's rank and percentage of high-wallet customer's rank.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

I. Overview

Figure 1:
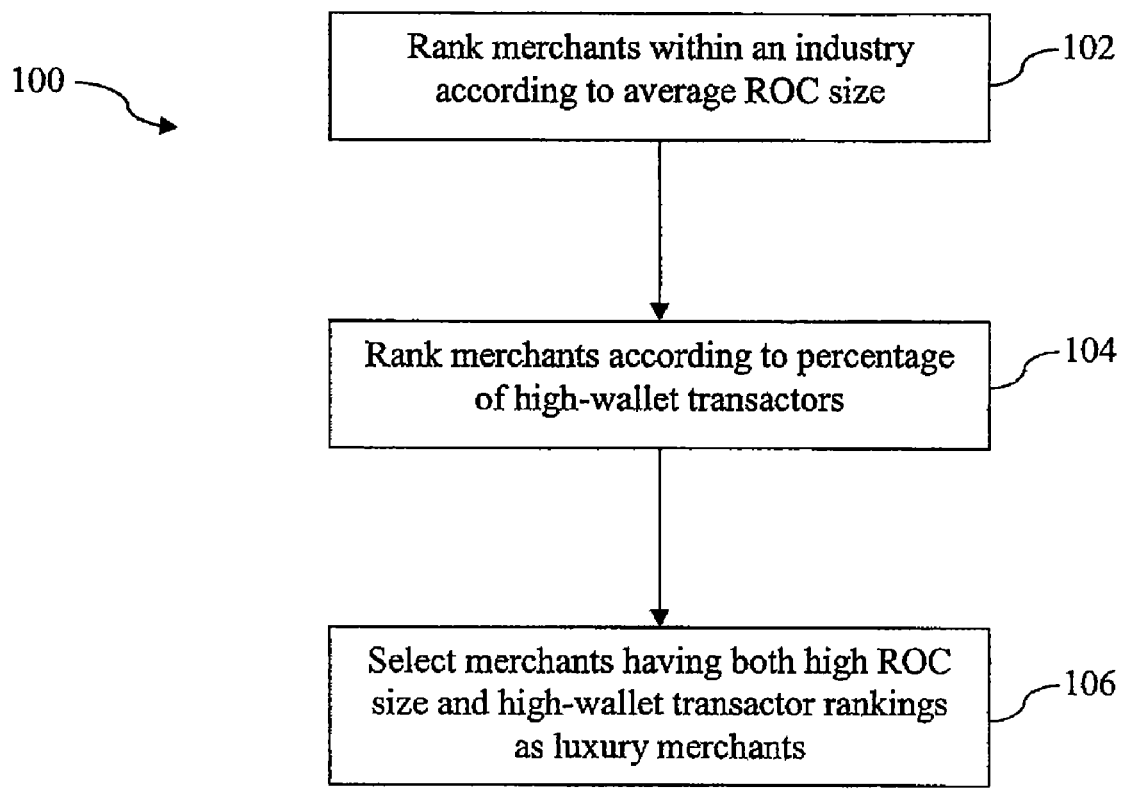
FIG. 1 is a flowchart of a method for identifying a luxury merchant according to an embodiment of the present invention.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for identifying luxury merchants and/or consumers.

Furthermore, the terms "business" or "merchant" may be used interchangeably with each other and shall mean any person, entity, distributor system, software, and/or hardware that is a provider, broker and/or any other entity in the distribution chain of goods or services. For example, a merchant may be a grocery store, a retail store, a travel agency, a service provider, an on-line merchant or the like.

1. Transaction Accounts and Instrument

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Open Versus Closed Cards

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

II. Identifying Luxury Merchants

A luxury merchant is a merchant having a higher than average transaction or record of charge (ROC) size compared to their industry peers, as well as having a disproportionate share of high wallet individuals as customers. Luxury merchants may be identified based on these two indicators.

FIG. 1 is a flowchart of a method 100 for identifying a luxury merchant, according to an embodiment of the present invention. In step 102, merchants within a given industry are ranked according to their average ROC size. Their average ROC size may be determined, for example and without limitation, from transactional statements for the merchant, transactional statements for customers of the merchant, or from requests for payment submitted by the merchant.

In step 104, each merchant is ranked according to the percentage of high-wallet customers who transact with that merchant. The percentage of high-wallet customers transacting with that merchant may be, for example, a ratio of high-wallet customers to all customers who transact with that merchant.

In step 106, merchants having both a high average ROC size ranking and a high percentage of high-wallet customers ranking are identified as luxury merchants.

Figure 2:
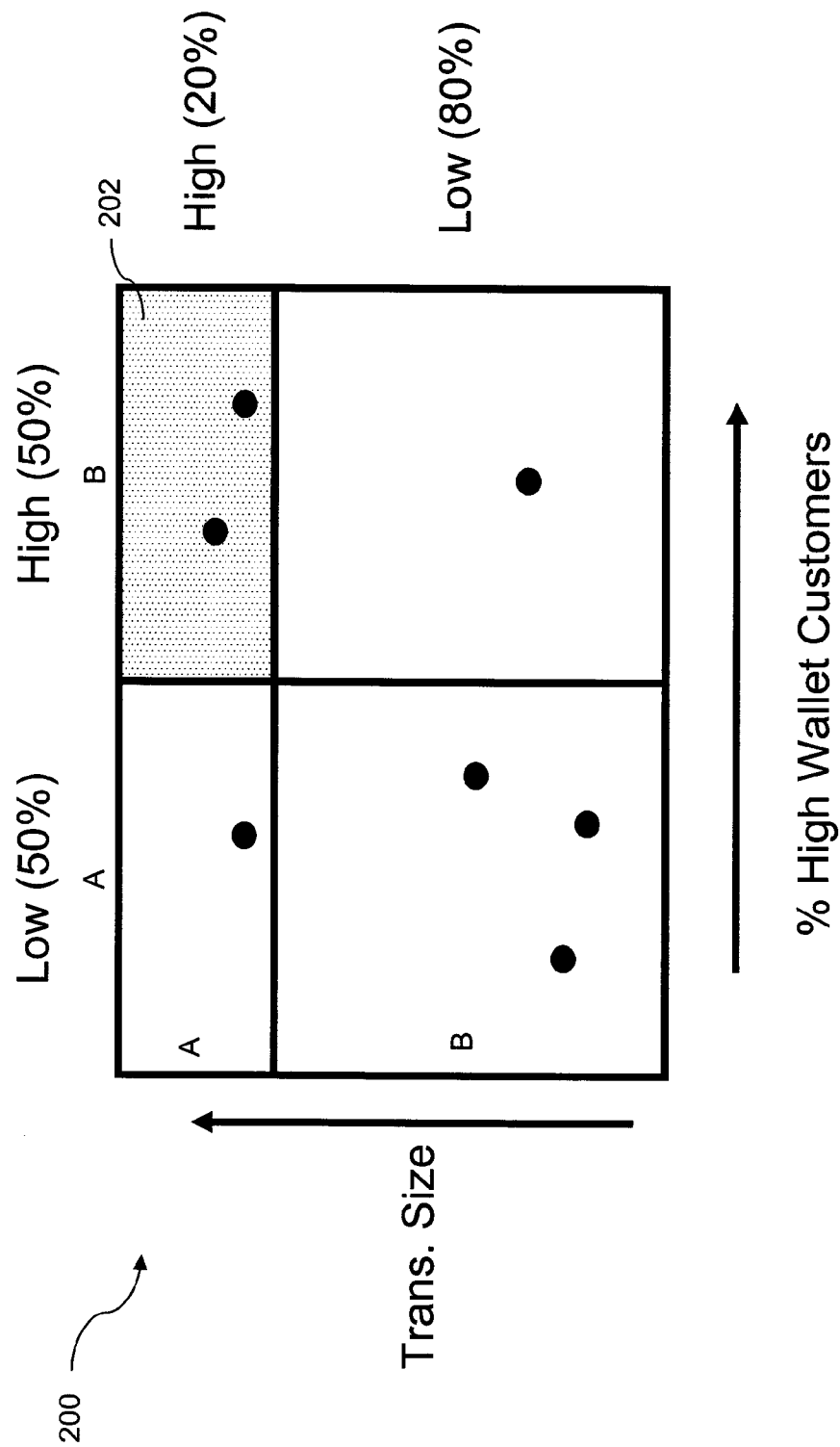
FIG. 2 is a diagram illustrating an exemplary luxury merchant selection.

FIG. 2 illustrates an example luxury merchant selection via a four-part diagram 200. Each point on diagram 200 is associated with a given merchant. Transaction size is illustrated as increasing along the vertical axis of diagram 200, while the percentage of high-wallet customers is illustrated as increasing along the horizontal axis of diagram 200. In the example of FIG. 2, the top 20% of merchants ranked according to their ROC sizes are considered high ROC size merchants. That is, merchants located in row A of diagram 200 are considered high ROC size merchants. Similarly, the top 50% of merchants ranked according to their high-wallet customer percentages are considered high share of high-wallet customer merchants. That is, merchants located in column B of diagram 200 are considered high share of high-wallet customer merchants. Any merchant who is identified as both a high ROC size merchant and a high share of high-wallet customer merchant is determined to be a luxury merchant. In the example of FIG. 2, merchants in section 202 (i.e., the intersection of row A and column B) are determined to be luxury merchants.

Figure 3:
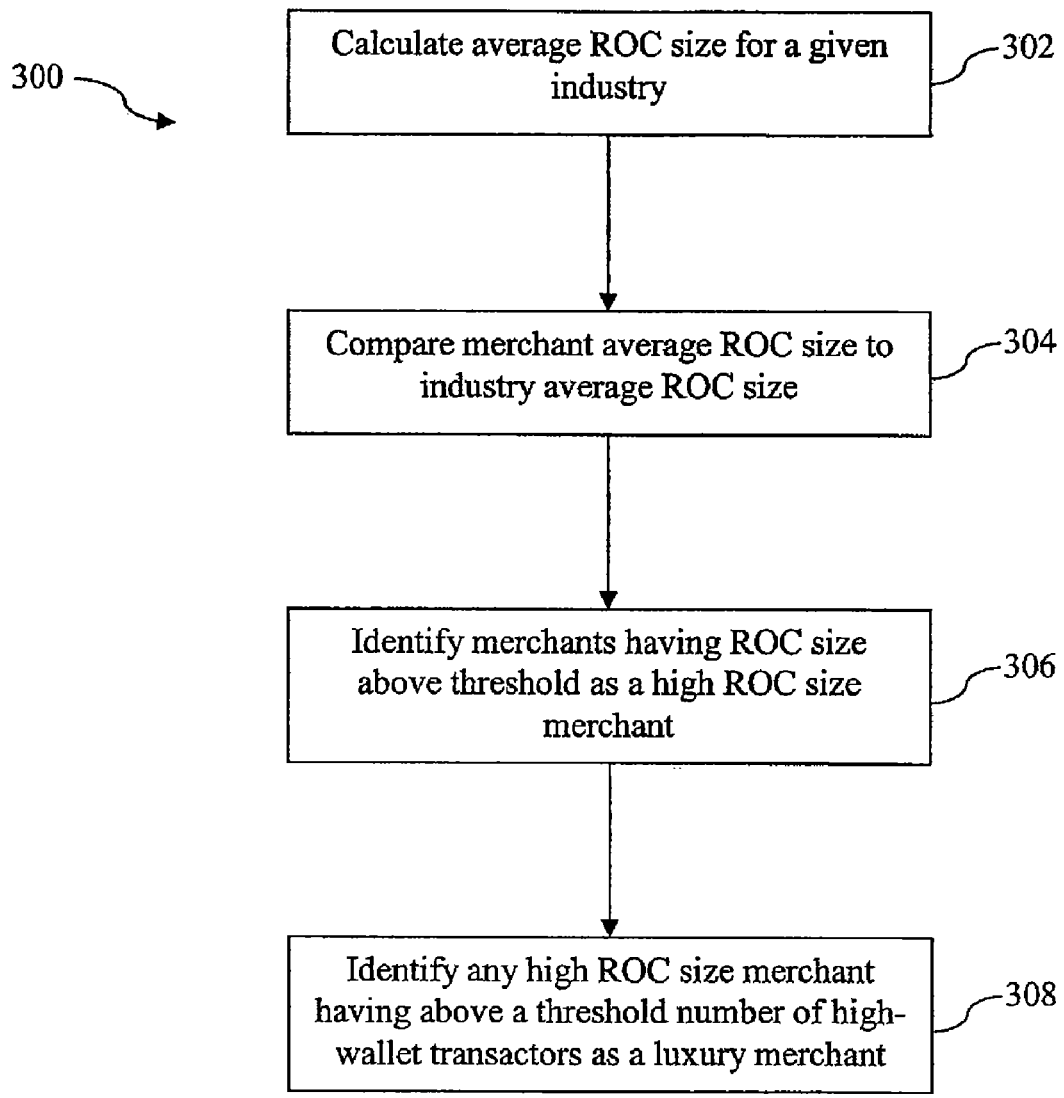
FIG. 3 is a flowchart of a method for identifying a luxury merchant according to another embodiment of the present invention.

FIG. 3 illustrates a second exemplary method for identifying luxury merchants. In step 302, an average ROC size is determined for a given industry. Merchants in a given industry may be determined, for example, based on industry classification associated with the merchants. Example industry classification systems are the Standard Industrial Classification (SIC) or the North American Industry Classification System. The average ROC size within an industry may be determined, for example, from the ROC sizes of multiple merchants associated a given industry classification.

In step 304, an average ROC size for one or more merchants is compared to the industry average ROC size.

In step 306, any merchant having an average ROC size above a certain threshold, wherein the threshold is based on the industry average ROC size, is determined to be a high ROC size merchant. For example, the threshold may be five times the industry average ROC size. In such an example, any merchant having a ROC size greater than five times the industry average ROC size would be considered a high ROC size merchant.

In step 308, any high ROC size merchant having a percent of high-wallet customers above a high-wallet customer threshold is determined to be a luxury merchant.

The determinations described with respect to methods 100 and 300 are scalable for different industries, as they take into consideration that average ROC sizes for some industries (e.g., restaurants) may be very different than average ROC sizes for other industries (e.g., jewelry). Further, such methods are quantitative, rather than qualitative or sales-force driven, allowing even merchants with low traffic and/or low brand name recognition to be identified as luxury merchants.

III. Luxury Consumer Identification

Figure 4:
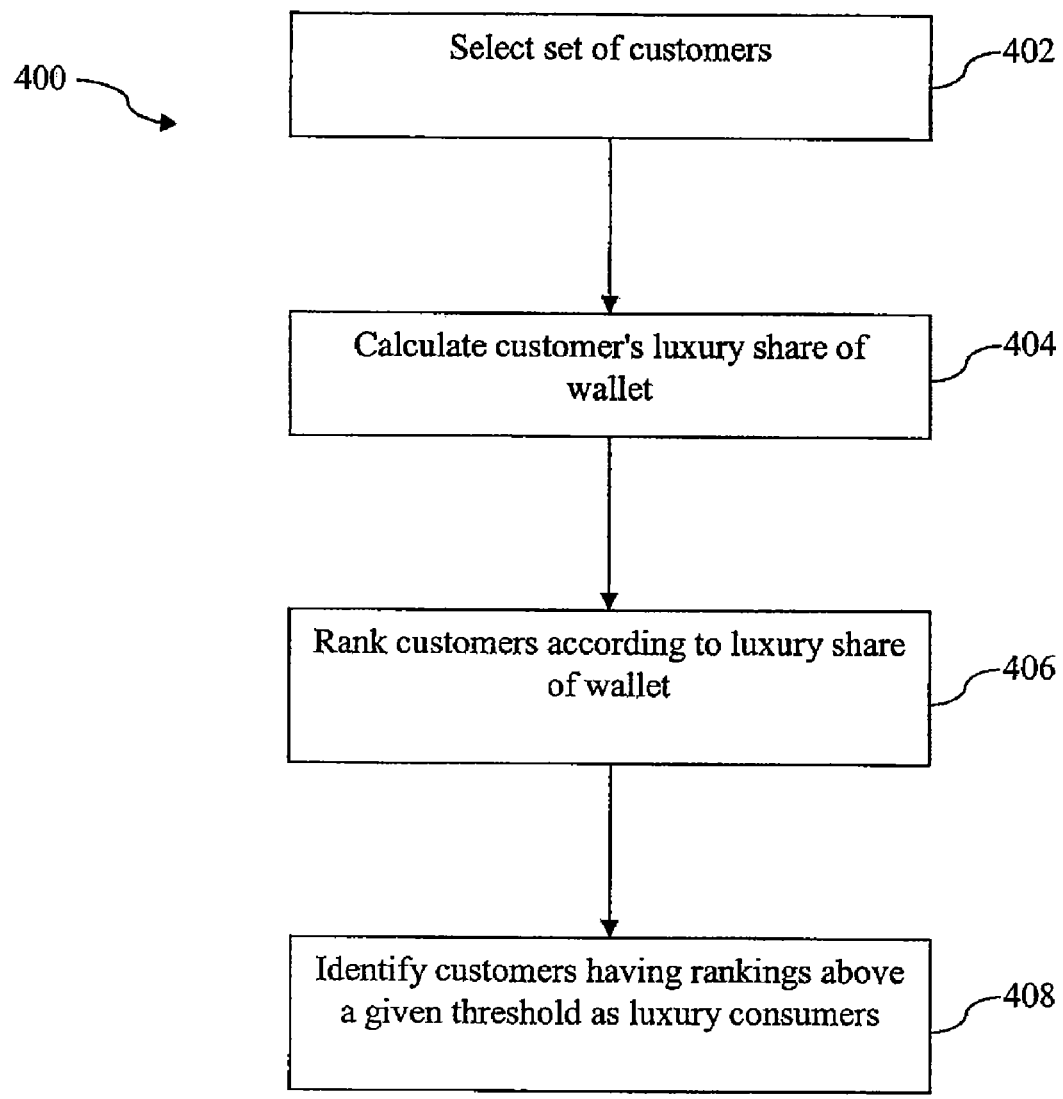
FIG. 4 is a flowchart of a method for identifying luxury consumers according to an embodiment of the present invention.

Once at least one luxury merchant has been identified, a luxury consumer can be identified by determining which customers have the greatest shares of luxury spending. Luxury consumers are those consumers who spend a significantly higher portion of their wallet at luxury merchants as compared to their peers. Luxury consumers need not be high-wallet customers—customers having relatively small wallets who spend a large portion of their wallet at luxury merchants may be considered luxury consumers. However, the majority of luxury consumers typically also have high wallets. FIG. 4 is a flowchart of a method 400 of identifying luxury consumers, according to an embodiment of the present invention.

In step 402, a set of customers is selected. The set may include, for example, all customers of a financial transaction company such as American Express Co., of New York, N.Y. In another example, the set may include a subset of all customers of the financial transaction company. In another example, the set of customers may include customers with who spend a portion of their wallet within a specific industry.

In step 404, the percentage of the customer's spending that occurs at a luxury merchant (e.g., the customer's luxury share of wallet) is determined for each customer in the set of customers. Such information may be determined, for example, based on the transaction history of each customer in the set of customers.

In step 406, each customer in the set of customers is ranked according to their percentage of luxury merchant spend.

In step 408, customers ranked above a given threshold are identified as luxury consumers. For example, the top 25% of customers may be identified as luxury consumers.

Method 400 may be performed, for example, for customers having a majority share of wallet with the financial transaction company (that is, more than 50% of the customer's transactions are with the financial transaction company), so that the financial transaction company has sufficient knowledge of the customer's transactions. However, a company may wish to target minority share customers (that is, less than 50% of the customer's transactions are with the financial transaction company). In such a situation, the financial transaction company may not have sufficient transactional data on the minority share customer to make an accurate luxury determination. Customer behavior modeling may then be used in addition to or instead of method 400 to estimate a customer's luxury spend.

A luxury behavior model may be developed using, for example, attributes of customers having a high share of wallet with the financial transaction company. In an embodiment, high share of wallet customers include those customers having 90% to 98% share of wallet with the financial transaction company. Minority share customers having attributes similar to identified luxury consumers may be determined to be luxury consumers based on such modeling. In one embodiment, modeling is used to estimate a minority share customer's luxury share of wallet, which can then be ranked in conjunction with method 400 to determine whether the minority share customer is a luxury consumer. Additional information on using modeling to determine an individual's share of wallet may be found in U.S. patent application Ser. No. 10/978,298, filed Oct. 29, 2004, titled "Method and Apparatus for Estimating the Spend Capacity of Consumers," which is incorporated by reference herein in its entirety.

Figure 5:
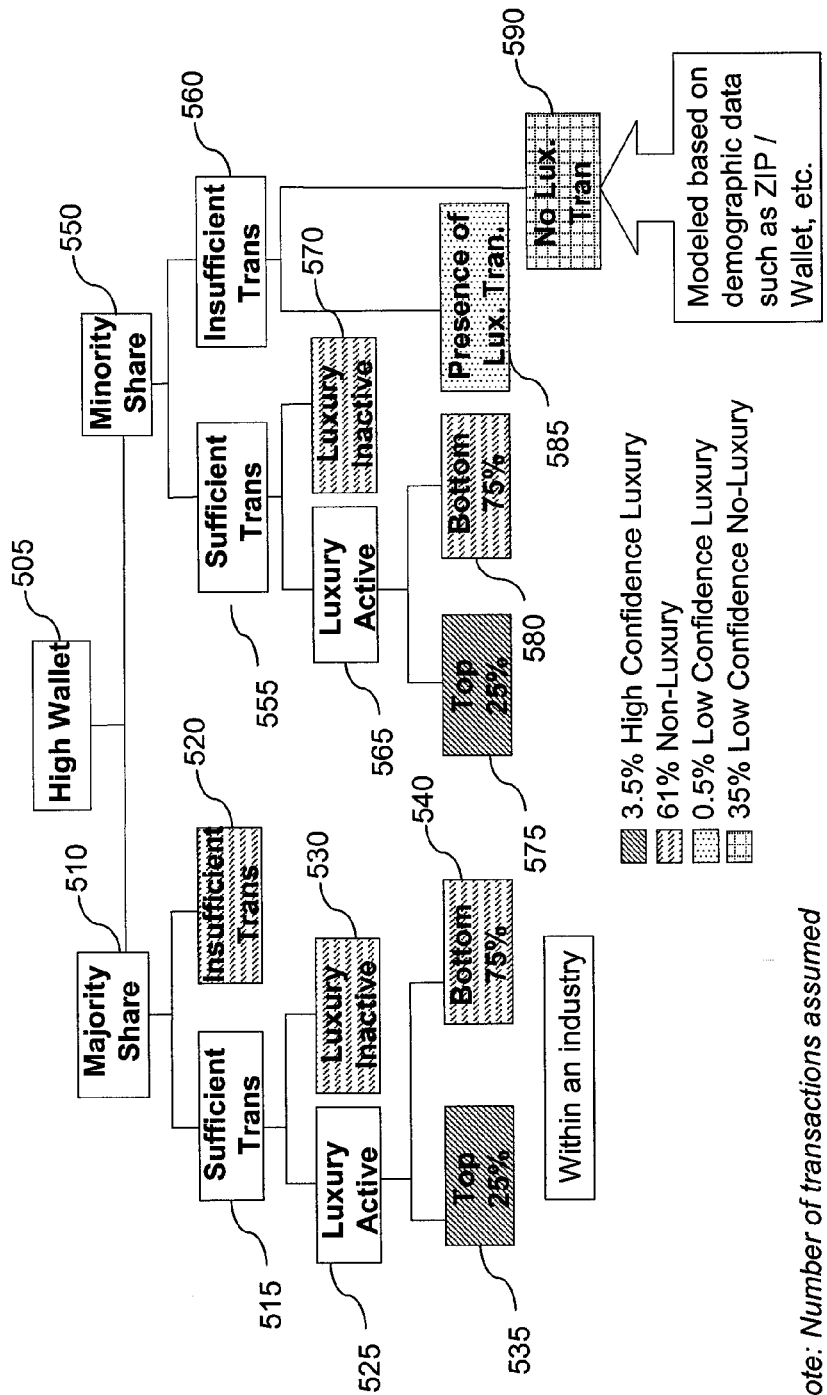
FIG. 5 is another flowchart of a method for identifying luxury consumers according to an embodiment of the present invention.

FIG. 5 is a flowchart further illustrating luxury consumer identification processes for both majority share and non-majority share consumers, according to an embodiment of the present invention.

Although the embodiment will be described with reference to high-wallet consumers, one of skill in the art will recognize that consumers who are not considered high wallet consumers may still be considered luxury consumers if they spend a disproportionately high amount of their wallet on luxury goods and/or with luxury merchants. In the embodiment of FIG. 5, high wallet 505 consumers include all consumers with a wallet greater than a determined amount. In one embodiment, the determined amount may be based on an average, such that, for example, any consumer with a wallet size higher than an average wallet size is considered a high-wallet customer. In another embodiment, the determined amount may be based on a specific amount, such as, for example, greater than $100,000. Of the high wallet 505 consumers, a financial transaction company may segment them in two groups, a majority share 510, and a minority share 550. Majority share consumers 510 include consumers which transact 50%, or more of their transactions with a financial transaction company. Minority share consumers 550 include those consumers with less than 50% of their transactions with the financial transaction company.

Majority share consumers 510 are also sufficient transaction consumers 515 when they generate a great enough volume of transactions which allow for the categorization and classification of their spending actions with a sufficient level of confidence. Insufficient transaction consumers 520 do not maintain a sufficient volume of transaction that allows them to be further classified.

Sufficient transaction consumers 515 are further segmented into luxury active consumers 525 and luxury inactive consumers 530. Luxury active consumers 525 are those consumers who have sufficient transactions with luxury merchants. Those consumers that may have sufficient transactions so as to be classified as a sufficient transaction consumer 515, but do not have sufficient transactions with luxury merchants, are classified as luxury inactive consumers 530.

The luxury active consumers 525 are then ranked in accordance with their level of spending with a luxury merchant. For example, luxury active consumers 525 may be ranked as top 25% consumers 535 and bottom 75% consumers 540.

Minority share consumers 550 may also be classified as sufficient transaction consumers 555 when they generate a great enough volume of transactions to allow for the categorization and classification of their spending actions with a sufficient level of confidence. Insufficient transaction consumers 560 do not maintain a sufficient volume of transactions that allows them to be further classified. However, while insufficient transaction consumers 560 may not be able to be further classified, their actions can be analyzed for the presence of luxury transactions 585 or that there are no luxury transactions 590.

Sufficient transaction consumers 555 are further segmented into luxury active consumers 565 and luxury inactive consumers 570. Luxury active consumers 565 are those consumers who have sufficient transactions with luxury merchants. Those consumers that may have sufficient transactions so as to be classified as a sufficient transaction consumer 555, but do not have sufficient transactions with luxury merchants, are classified as luxury inactive consumers 570.

The luxury active consumers 565 are then ranked in accordance with their level of spending with a luxury merchant. For example, luxury active consumers 565 may be ranked as top 25% consumers 575 and bottom 75% consumers 580.

Additionally, some luxury customers cannot be identified solely from association with luxury merchants, because some merchants have both luxury and non-luxury options. For example, luxury airline customers cannot be identified solely from association with luxury merchants, because most airlines have both luxury (e.g., first class, business class) and non-luxury (e.g., coach class) components. To identify such luxury consumers, transaction information from ticket purchases is used to identify the class of travel. For example, airline ticket transaction data may include a code that identifies a particular class aboard a given airline. The airline class of travel is then used to identify luxury consumers. In an embodiment, customers purchasing first-class and/or business-class tickets are identified as luxury consumers.

Once at least one luxury consumer has been identified, the luxury consumer may be targeted with marketing and/or promotional items by, for example, a financial transaction company.

Figure 7:
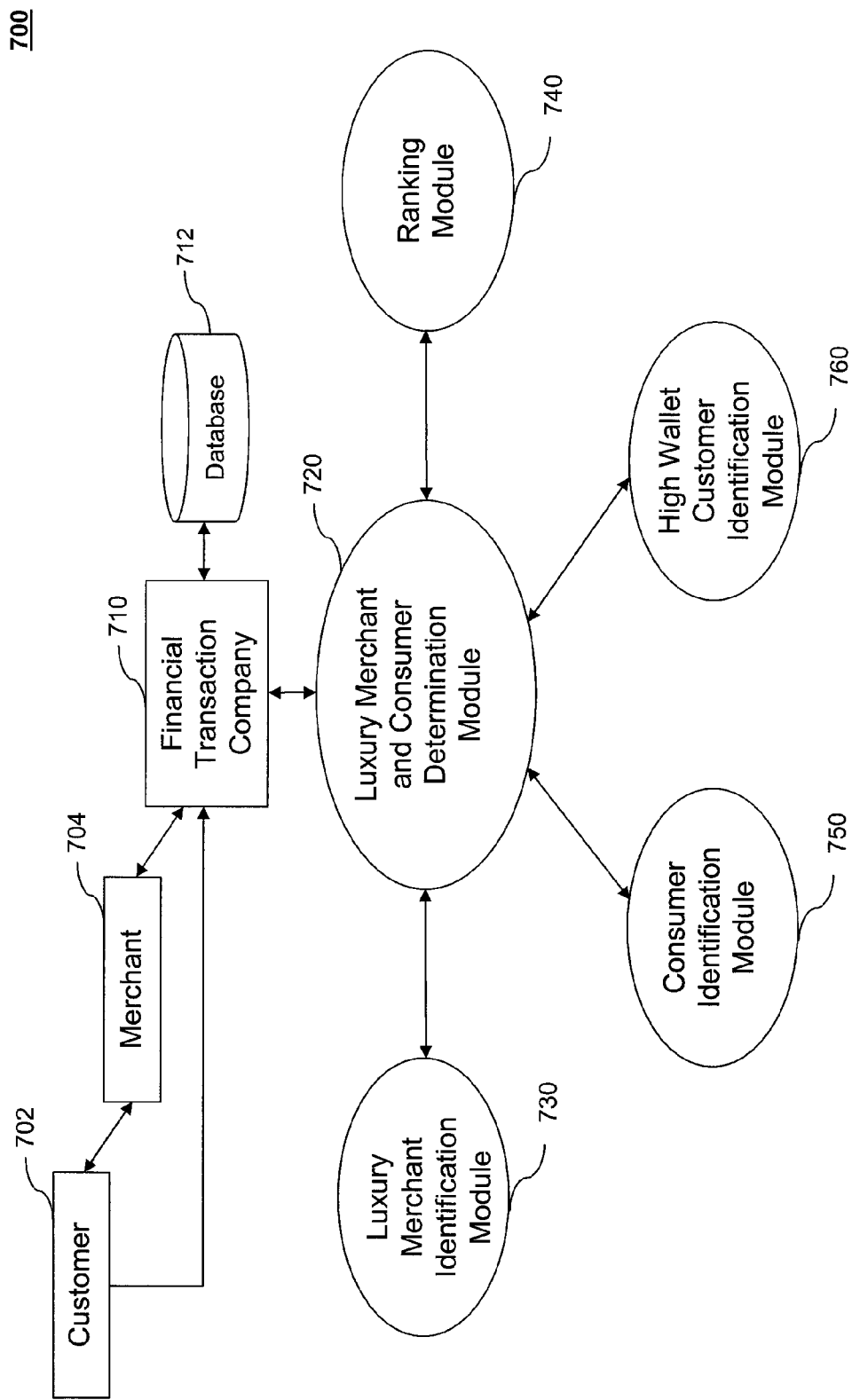
FIG. 7 is an illustration of a luxury merchant and consumer identification system according to an embodiment of the present invention.

FIG. 7 is an illustration of a luxury merchant and consumer identification system 700 according to an embodiment of the present invention. A customer 702 may transact business with merchant 704. The merchant may maintain a transaction account with a financial transaction company 710. When customer 702 transacts business with merchant 704, utilizing financial transaction company 710, the record of charge for the transaction may be stored on database 712, along with other pertinent data. Financial transaction company 710 may also receive information regarding the customer, for example, information concerning buying preferences and transaction history, directly from customer 702.

In an embodiment, in order for luxury merchant and consumer determination module 720 to determine whether customer 702 is a luxury consumer, luxury merchant and consumer determination module 720 must also determine if merchant 704 is a luxury merchant.

Luxury merchant identification module 730, customer identification module 750, high wallet customer identification module 760, and ranking module 740 are utilized to analyze specific customer and merchant customer information. In an embodiment, luxury merchant identification module 730 identifies a merchant 704, which transacts business with a customer 702. Customer identification module 750 identifies the customer 702 that spends a portion of that customer's wallet with merchant 704.

In an embodiment, any customer who spends a disproportionate amount of their wallet at luxury merchants may be identified as a luxury consumer. In another embodiment, only those customers 702 with a high-wallet amount may be luxury consumers. High wallet customer identification module 760 identifies those customers 702, which fit the wallet size criteria. In addition, in order to be a luxury consumer, the high-wallet customer must also transact business with a luxury merchant. Luxury merchant and consumer determination module 720 determines if merchant 704 is a luxury merchant based on the merchant's record of charge (ROC) rank and percentage of high-wallet customers rank. Ranking module 740 performs the ranking function for merchant 704 as a function of the merchant's ROC data stored in database 712 and in an embodiment, will rank merchant by ROC rank as compared to other merchants in the same industry.

Ranking module 740 may also rank merchant 704 based on the merchant's percentage of high-wallet customers as identified by high-wallet customer identification module 760.

In another embodiment, ranking module 740 may rank customer 702 according to the percentage of wallet spent at luxury merchants. Luxury merchant and consumer determination module 720 may then determine whether customer 702 is a luxury consumer based on the percentage of wallet spent at the identified luxury merchants.

In another embodiment, luxury merchant and consumer determination module 720 may determine that merchant 704 is a luxury merchant based on ROC size, industry average ROC size, or a multiple of industry average ROC size.

IV. Example Implementations

The present invention or any part(s) or function(s) thereof may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general-purpose digital computers or similar devices.

Figure 6:
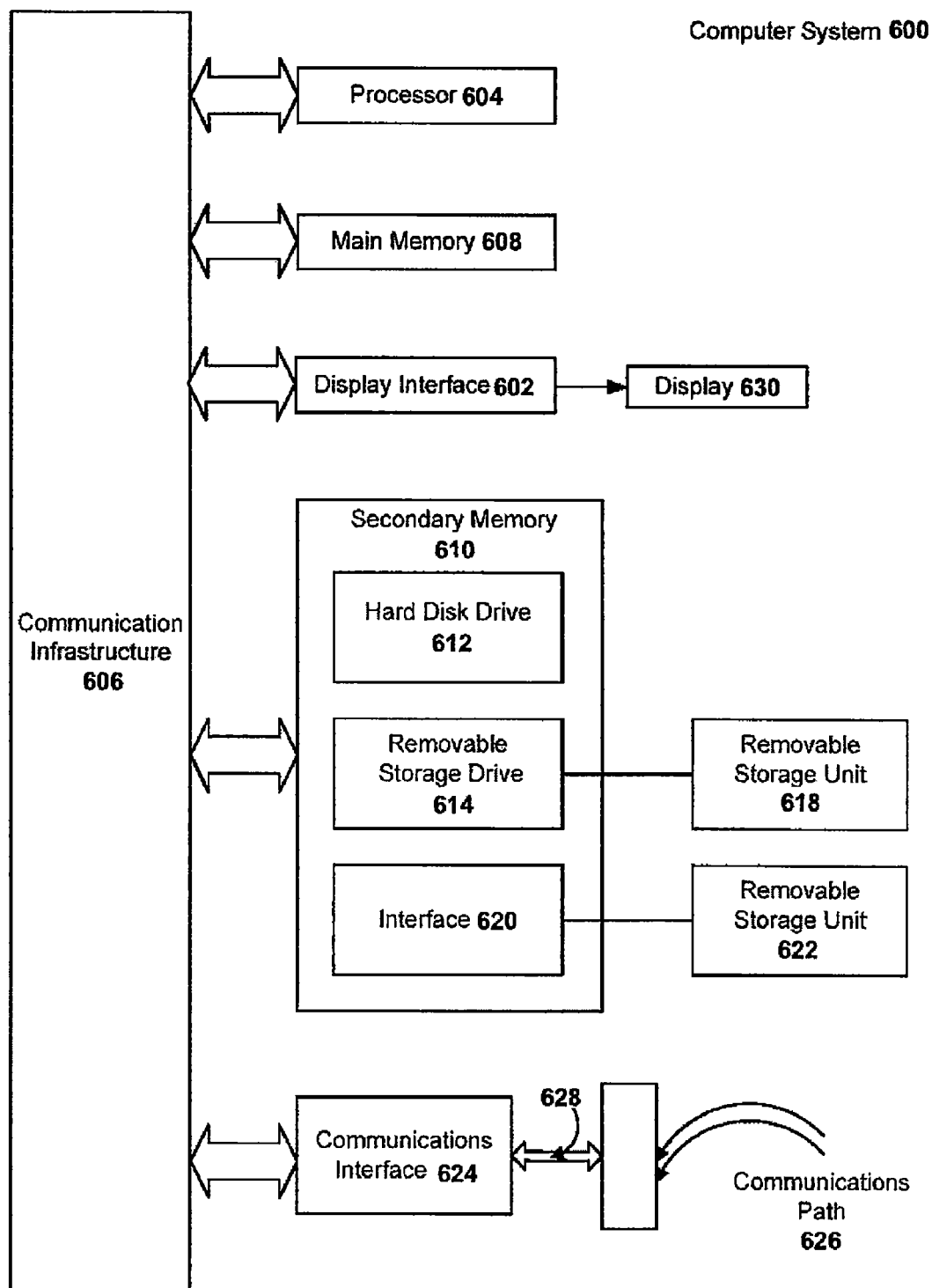
FIG. 6 is a block diagram of an exemplary computer system useful for implementing the present invention.

In fact, in one embodiment, the invention is directed toward one or more computer systems capable of carrying out the functionality described herein. An example of a computer system 600 is shown in FIG. 6.

The computer system 600 includes one or more processors, such as processor 604. The processor 604 is connected to a communication infrastructure 606 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 600 can include a display interface 602 that forwards graphics, text, and other data from the communication infrastructure 606 (or from a frame buffer not shown) for display on the display unit 630.

Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618 represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical, or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 614 and a hard disk installed in hard disk drive 612. These computer program products provide software to computer system 600. The invention is directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. In particular, the computer programs, when executed, enable the processor 604 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 604, causes the processor 604 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. An article of manufacture including a non-transitory, tangible computer readable medium having instructions stored thereon that, in response to execution by a computer-based system for analyzing consumers, cause the computer-based system to perform operations comprising:

receiving, by the computer-based system, a merchant's record of charge (ROC) data from a financial transaction;

ranking, by the computer-based system, a merchant based on the merchant's ROC data to generate a merchant's ROC ranking;

ranking, by the computer-based system, the merchant based on a merchant's percentage of high-wallet customers;

determining, by the computer-based system, that the merchant is a luxury merchant in response to the merchant's ROC ranking exceeding a first threshold and the merchant's percentage of high-wallet customers transacting with the merchant ranking exceeding a second threshold;

receiving, by the computer-based system, a consumer transaction history;

identifying, by the computer-based system, a consumer who spends a percentage of a consumer's wallet at one or more of the determined luxury merchants;

ranking, by the computer-based system, the consumer according to the percentage of the consumer's wallet spent at the one or more of the determined luxury merchants;

determining, by the computer-based system, that the consumer is a luxury consumer in response to the percentage of the consumer's wallet spent at the one or more of the determined luxury merchants exceeding a third threshold; and determining, by the computer-based system, a confidence level in the determining that the consumer is the luxury consumer and a classification of the consumer comprising:

i) classifying, with a first level of confidence, the consumer as a majority share luxury active consumer in response to:

the majority share luxury active consumer having greater than a first volume of transactions in the consumer transaction history;

the majority share luxury active consumer having greater than a second volume of transactions with the one or more of the determined luxury merchants; and ranking the majority share luxury active consumer in accordance with the level of spending at the one or more of the determined luxury merchants to determine whether the majority share luxury active consumer is within a top portion of majority share luxury active consumers;

wherein a majority share consumer performs 50% or more of the consumer's transactions with a financial transaction company; or ii) classifying, with a second level of confidence, the consumer as a minority share luxury active consumer in response to:

the minority share luxury active consumer having greater than a third volume of transactions in the consumer transaction history;

the minority share luxury active consumer having greater than a fourth volume of transactions with the one or more of the determined luxury merchants; and ranking the minority share luxury active consumer in accordance with the level of spending at the one or more of the determined luxury merchants to determine whether the minority share luxury active consumer is within a top portion of minority share luxury active consumers;

wherein a minority share consumer performs less than 50% of the consumer's transactions with the financial transaction company.

2. The article of claim 1, wherein the ranking of the merchant based on the merchant's ROC data and the ranking of the merchant based on the merchant's percentage of high-wallet customers are each performed relative to other merchants in a common industry.

3. The article of claim 2, wherein the first threshold is determined to include the top 20% ranked merchants based on ROC size.

4. The article of claim 3, wherein the second threshold is determined to include the top 50% ranked merchants based on percentage of high-wallet customers.

5. The article of claim 3, wherein the first threshold is based on at least one of:

an industry average ROC size; and a multiple of the industry average ROC size.

6. The article of claim 5, wherein the consumer is identified from at least one of:

a set of all customers of the financial transaction company; and a subset of all customers of the financial transaction company.

7. The article of claim 5, wherein the consumer is identified as a consumer who spends the percentage of the consumer's wallet within the common industry.

8. The article of claim 6, wherein the third threshold includes the top 25% of consumers ranked according to the percentage of the consumer's wallet spent at the one or more of the determined luxury merchants.

9. The article of claim 8, wherein the consumer is analyzed as to whether the consumer is a luxury consumer by the use of a luxury modeling analysis in response to less than a predetermined amount of the consumer's transactions being with the financial transaction company.

10. The article of claim 9, wherein a customer having attributes similar to a previously-identified luxury consumer is determined to be a luxury consumer.

11. The article of claim 9, wherein a customer having attributes similar to a previously-identified luxury consumer is determined to have a similar luxury share of wallet.

12. The article of claim 8, wherein the consumer is determined to be a luxury consumer in response to the consumer purchasing first-class and/or business-class airline travel.

13. A luxury merchant and consumer identification system, comprising:

a processor, a tangible, non-transitory memory configured to communicate with the processor, the tangible, non-transitory memory having instructions stored thereon that, in response to execution by the processor, cause the processor to perform operations comprising:

a luxury merchant identification module which identifies a merchant which transacts business with a consumer in a financial transaction;

a database which stores merchant's record of charge (ROC) data from the financial transaction;

a consumer identification module which identifies the consumer which spends a portion of a consumer's wallet with the merchant based on a consumer transaction history;

a high-wallet customer identification module which identifies the consumer as a high-wallet customer based on the size of the consumer's wallet;

a ranking module which ranks the merchant based on the merchant's ROC data to generate a merchant's ROC rank and ranks the merchant based on a merchant's percentage of high-wallet customers to generate a merchant's percentage of high-wallet customer rank, wherein the merchant's percentage of high-wallet customers is the ratio of high-wallet customers, as determined by the high-wallet customer identification module, to all merchant customers;

a luxury merchant and consumer determination module which determines whether the merchant is a luxury merchant based on the merchant's ROC rank and percentage of high-wallet customer rank, wherein the luxury merchant and consumer determination module determines that the consumer is a luxury consumer and classifies the consumer as:

i) a majority share luxury active consumer, with a first level of confidence, in response to:

the majority share luxury active consumer having greater than a first volume of transactions in the consumer transaction history;

the majority share luxury active consumer having greater than a second volume of transactions with one or more of the determined luxury merchants; and ranks the majority share luxury active consumer in accordance with a level of spending at the one or more of the determined luxury merchants to determine whether the majority share luxury active consumer is within a top portion of majority share luxury active consumers;

wherein a majority share consumer performs 50% or more of the consumer's transactions with a financial transaction company; or ii) a minority share luxury active consumer, with as second level of confidence, in response to:

the minority share luxury active consumer having greater than a third volume of transactions in the consumer transaction history;

the minority share luxury active consumer having greater than a fourth volume of transactions with one or more of the determined luxury merchants; and ranks the minority share luxury active consumer in accordance with the level of spending at the one or more of the determined luxury merchants to determine whether the minority share luxury active consumer is within a top portion of minority share luxury active consumers;

wherein a minority share consumer performs less than 50% of the consumer's transactions with the financial transaction company.

14. The system of claim 13, wherein the ranking module ranks the merchant according to the merchant's percentage of high-wallet customers relative to other merchants in a common industry.

15. The system of claim 13, wherein the luxury merchant and consumer determination module determines that the merchant is a luxury merchant based on at least one of:
   a set of top merchants ranked based on ROC size,
   an industry average ROC size; and
   a multiple of the industry average ROC size.

16. The system of claim 15, wherein the luxury merchant and consumer determination module determines that the merchant is a luxury merchant which includes the top 50% of merchants ranked based on percentage of high-wallet customers.

17. The system of claim 16, wherein the luxury merchant and consumer determination module determines that the consumer is a luxury consumer by the use of a behavior modeling analysis in response to less than a predetermined amount of the customer's transactions being with all the financial transaction company.

18. A non-transitory computer-readable medium having control logic stored therein, which when executed by a computer based system for identifying luxury merchants and consumers cause the computer based system to perform operations comprising:
   receiving merchant's record of charge (ROC) data from a financial transaction;
   ranking a merchant based on the merchant's ROC data to generate a merchant's ROC ranking;
   ranking the merchant based on the merchant's percentage of high-wallet customers;
   determining that the merchant is a luxury merchant in response to the merchant's ROC ranking exceeding a first threshold and the merchant's percentage of high-wallet customers transacting with the merchant ranking exceeds a second threshold;
   receiving a consumer transaction history,
   identifying a consumer who spends a percentage of a consumer's wallet at one or more of the determined luxury merchants;
   ranking the consumer according to the percentage of the consumer's wallet spent at the one or more of the determined luxury merchants;
   determining that the consumer is a luxury consumer in response to the percentage of the consumer's wallet spent at the one or more of the determined luxury merchants exceeding a third threshold; and
   wherein the first threshold includes at least one of:
   a set of top 20% ranked merchants based on ROC size;
   an industry average ROC size; and
   a multiple of the industry average ROC size;
   wherein the second threshold includes the top 50% ranked merchants based on the percentage of high-wallet customers; and
   wherein the third threshold includes the top 25% of customers ranked according to percentage of wallet spent at luxury merchants;
   determining a confidence level in the determining that the consumer is the luxury consumer and a classification of the consumer comprising:
   i) classifying, with a first level of confidence, the consumer as a majority share luxury active consumer in response to:
      the majority share luxury active consumer having greater than a first volume of transactions in the consumer transaction history;
      the majority share luxury active consumer having greater than a second volume of transactions with the one or more of the determined luxury merchants; and
      ranking the majority share luxury active consumer in accordance with a level of spending with at the one or more of the determined luxury merchants to determine whether the majority share luxury active consumer is within a top portion of majority share luxury active consumers;
      wherein a majority share consumer performs 50% or more of the consumer's transactions with a financial transaction company; or
   ii) classifying, with a second level of confidence, the consumer as a minority share luxury active consumer in response to:
      the minority share luxury active consumer having greater than a third volume of transactions in the consumer transaction history;
      the minority share luxury active consumer having greater than a fourth volume of transactions with the one or more of the determined luxury merchants; and
      ranking the minority share luxury active consumer in accordance with the level of spending at the one or more of the determined luxury merchants to determine whether the share luxury active consumer is within a top portion of minority share luxury active consumers;
      wherein a minority share consumer performs less than 50% of the consumer's transactions with the financial transaction company.

* * * * *

UNITED STATES PATENT AND TRADEMARK OFFICE
CERTIFICATE OF CORRECTION

PATENT NO. : 8,380,559 B2
APPLICATION NO. : 12/144503
DATED : February 19, 2013
INVENTOR(S) : Karlyn Heiner Crotty et al.

It is certified that error appears in the above-identified patent and that said Letters Patent is hereby corrected as shown below:

In Column 14 Line 44, after "the" please insert --minority--.

Signed and Sealed this
Ninth Day of April, 2013

Teresa Stanek Rea
*Acting Director of the United States Patent and Trademark Office*